US008787650B2

(12) United States Patent
Marugame

(10) Patent No.: US 8,787,650 B2
(45) Date of Patent: Jul. 22, 2014

(54) PATHOLOGICAL DIAGNOSIS SUPPORT

(75) Inventor: Atsushi Marugame, Tokyo (JP)

(73) Assignee: NEC Corporation, Tokyo (JP)

(*) Notice: Subject to any disclaimer, the term of this patent is extended or adjusted under 35 U.S.C. 154(b) by 695 days.

(21) Appl. No.: 12/358,863

(22) Filed: Jan. 23, 2009

(65) Prior Publication Data
US 2009/0190821 A1 Jul. 30, 2009

(30) Foreign Application Priority Data
Jan. 29, 2008 (JP) .................. 2008-017750

(51) Int. Cl.
G06K 9/00 (2006.01)
(52) U.S. Cl.
USPC .......... 382/133; 382/128; 382/165; 382/172; 706/20
(58) Field of Classification Search
USPC ..................... 382/133, 165, 172, 128; 706/20
See application file for complete search history.

(56) References Cited

U.S. PATENT DOCUMENTS

| 6,026,174 | A | 2/2000 | Palcic et al. | |
|---|---|---|---|---|
| 7,136,540 | B2 * | 11/2006 | Kiyuna | 382/282 |
| 7,415,148 | B2 * | 8/2008 | Wrigglesworth et al. | 382/133 |
| 2002/0058887 | A1 | 5/2002 | Soito et al. | |
| 2005/0239095 | A1 * | 10/2005 | Lu et al. | 435/6 |
| 2005/0266395 | A1 * | 12/2005 | Gholap et al. | 435/4 |
| 2006/0204953 | A1 * | 9/2006 | Ptitsyn | 435/4 |
| 2009/0004647 | A1 | 1/2009 | Miura et al. | |
| 2009/0262993 | A1 * | 10/2009 | Kotsianti et al. | 382/128 |
| 2010/0061618 | A1 | 3/2010 | Marcelpoil et al. | |

FOREIGN PATENT DOCUMENTS

| JP | 2001512824 A | 8/2001 |
|---|---|---|
| JP | 2004505278 A | 2/2004 |
| JP | 2004286666 A | 10/2004 |
| JP | 2005535892 A | 11/2005 |
| JP | 2005331394 A | 12/2005 |
| JP | 2005352571 A | 12/2005 |
| JP | 2006153742 A | 6/2006 |
| WO | 2006011587 A1 | 2/2006 |
| WO | 2006124651 A2 | 11/2006 |

OTHER PUBLICATIONS

Japanese Office Action for JP2008-017750 mailed on Sep. 18, 2012.

* cited by examiner

Primary Examiner — Arnold Kinkead
Assistant Examiner — Richard Tan
(74) Attorney, Agent, or Firm — Sughrue Mion, PLLC

(57) ABSTRACT

A pathological diagnosis support apparatus into which a digital color image showing a stained tissue sample is input, the apparatus including: a display that performs a display operation; and an image processor that when the digital color image is input, extracts cell nucleus areas, cytoplasm areas and glandular cavity areas, respectively, based on luminance values of pixels of the digital color image, measures basic feature quantities representing features of shapes of the respective cell nucleus areas, cytoplasm areas and glandular cavity areas, which have been extracted, determines whether or not a particular kind of area that appears in a limited case according to the disease state of the tissue sample exists, for each of the cell nucleus areas, the cytoplasm areas and the glandular cavity areas based on the luminance values and the basic feature quantities, and measures structure feature quantities representing ways in which the cell nucleus areas are positioned, based on the basic feature quantities of the cell nucleus areas, and if the particular kind of area exists, extracts the particular kind of area and makes the display show it together with the structure feature quantities and the cell nucleus areas.

3 Claims, 11 Drawing Sheets

PATHOLOGICAL DIAGNOSIS SUPPORT

This application is based upon and claims the benefit of priority from Japanese Patent Application No. 2008-017750 filed on Jan. 29, 2008, the content of which is incorporated by reference.

BACKGROUND OF THE INVENTION

1. Field of the Invention

The present invention relates to a pathological diagnosis support apparatus and a pathological diagnosis support method, which extract and measure information necessary for a pathological expert to make a pathological diagnosis using a pathological image showing a stained tissue sample and display the information, and to a storage medium that stores a program that causes a computer execute the method.

2. Description of the Related Art

In recent years, pathological diagnosis support apparatuses that extract and measure information necessary for a pathological expert to make a pathological diagnosis from a pathological image input as a digital color image using, e.g., a microscope or digital camera, etc., and display the information have been proposed, and an example of such apparatuses is disclosed in Japanese Patent Laid-Open No. 2004-286666.

The pathological diagnosis support apparatus described in Japanese Patent Laid-Open No. 2004-286666 includes: nucleus and cytoplasm distribution estimating means for identifying cell nucleus areas and cytoplasm areas, respectively, from a pathological image; glandular cavity distribution extracting means for identifying glandular cavity areas (areas including almost no cell tissues) from the pathological image; cancer site estimating means for determining whether or not cancer cells exist; progression degree determining means for determining the degree of progression of cancer; and image displaying means for displaying, e.g., a distribution map and/or the degree of progression of cancer cells.

A pathological image which is input to the pathological diagnosis support apparatus described in Japanese Patent Laid-Open No. 2004-286666 shows a tissue sample stained with H & E (hematoxylin and eosin). Thus, cell nuclei are stained in blue, cytoplasms are stained in red, and glandular cavities are not stained. As a result, in the pathological image, the cell nucleus areas have the characteristic of exhibiting a large luminance value (value indicating brightness) for blue, the cytoplasm areas have the characteristic of exhibiting a large luminance value for red, and the glandular cavity areas have the characteristic of their luminance value being represented by a value related to white.

In the pathological diagnosis support apparatus described in Japanese Patent Laid-Open No. 2004-286666, first, the nucleus and cytoplasm distribution estimating means identifies cell nucleus areas and cytoplasm areas, respectively, based on the luminance values of the respective pixels constituting a pathological image. Then, the cancer site estimating means determines whether or not a cancer cell area exists in each of regions obtained as a result of dividing the pathological image into a plurality of regions. Here, an operation of the cancer site estimating means to determine whether or not a cancer cell area exists will be described in detail.

The cancer site estimating means calculates the total number of the pixels for a cell nucleus area and a cytoplasm area identified by the nucleus and cytoplasm distribution estimating means. Then, the cancer site estimating means compares the total number of the pixels with predetermined threshold value Ts. If the total number is determined to be equal to or larger than threshold value Ts as a result of the comparison, the cancer site estimating means calculates the N/C ratio (nuclear-cytoplasmic ratio) of the region, which is a value for determining whether or not the region includes cancer cells, using formula (1) indicated below.

$$N/C \text{ ratio} = (\text{number of pixels for cell nucleus area}) / (\text{number of pixels for cytoplasm area}) \quad (1)$$

The cancer site estimating means, upon calculation of the N/C ratio, compares the calculated N/C ratio with predetermined threshold value Tr. Then, the cancer site estimating means identifies the region as a cancer cell area if the N/C ratio is equal to or larger than threshold value Tr.

When the cancer site estimating means identifies the cancer cell area, the glandular cavity distribution extracting means identifies glandular cavity areas based on the luminance values of the pixels constituting the pathological image. Then, the glandular cavity distribution extracting means measures feature quantities for each identified glandular cavity area, which quantitatively represent the features of the shape of the glandular cavity area. Feature quantities includes, e.g., area, circumferential length, which indicates the length of the contour of a glandular cavity area, and degree of circularity, which indicates similarity to a circular shape.

When the glandular cavity distribution extracting means have measured the feature quantities, the progress degree determining means determines the degree of progression of cancer with regard to glandular cavity areas included in the cancer cell area identified by the cancer site estimating means from among the glandular cavity areas. More specifically, the progression degree determining means compares the feature quantities measured by the glandular cavity distribution extracting means with data indicating feature quantities related to the degrees of progression of the cancer, and selects the degree of progression in the data that exhibits the most similar feature quantities.

Upon the progression degree determining means determining the degree of progression, the image displaying means displays a distribution map for the cancer cell area identified by the cancer site estimating means and/or the degree of progression of cancer determined by the progression degree determining means.

The pathological diagnosis support apparatus described in Japanese Patent Laid-Open No. 2004-286666 enables extraction of a cancer cell area from a pathological image and/or determination of the degree of progression of cancer by means of quantitatively measuring cell nuclei and cytoplasms and measuring the feature quantities of glandular cavities.

Use of the pathological diagnosis support apparatus described in Japanese Patent Laid-Open No. 2004-286666 enables determination of whether or not cancer cells exist and/or of the degree of progression of cancer. However, a pathological image may include benign tumor cells besides cancer cells, which are of a malignant tumor, and normal cells.

In the aforementioned case, when a pathological expert determines whether cells are cancer cells or benign tumor cells from a pathological image, information indicating the features of the structure of the tissue sample such as the manners in which cell nuclei are positioned is an important clue in addition to the aforementioned N/C ratio and the feature quantities of glandular cavities. Also, information indicating whether or not particular kinds of cells, that provide a basis for determining the cells as cancer cells (for example, signet ring cells), exist is an important clue.

In the pathological diagnosis support apparatus described in Japanese Patent Laid-Open No. 2004-286666, such information is not obtained. Thus, the information obtained by the pathological diagnosis support apparatus described in Japanese Patent Laid-Open No. 2004-286666 alone cannot provide sufficient pathological diagnosis support.

SUMMARY OF THE INVENTION

An object of the present invention is to provide a pathological diagnosis support apparatus and a pathological diagnosis support method enabling provision of enhanced pathological diagnosis support, and a storage medium storing a program for causing a computer execute the method.

A pathological diagnosis support apparatus according to the present invention, which is provided to achieve the object, is a pathological diagnosis support apparatus to which a digital color image showing a stained tissue sample is input, the apparatus comprising:

a display that performs a display operation; and an image processor that upon the digital color image being input, extracts cell nucleus areas, cytoplasm areas and glandular cavity areas, respectively, based on luminance values of pixels of the digital color image, measures basic feature quantities representing features of shapes of the respective cell nucleus areas, cytoplasm areas and glandular cavity areas, which have been extracted, determines whether or not a particular kind of area that appears in a limited case according to the disease state of the tissue sample exists, for each of the cell nucleus areas, the cytoplasm areas and the glandular cavity areas based on the luminance values and the basic feature quantities, and measures structure feature quantities representing manners in which the cell nucleus areas are positioned, based on the basic feature quantities of the cell nucleus areas, and if the particular kind of area exists, extracts the particular kind of area and makes the display show it together with the structure feature quantities and the cell nucleus areas.

Also, a pathological diagnosis support method according to the present invention, which is provided to achieve the object, is a method for supporting a pathological diagnosis using a digital color image showing a stained tissue sample, the method comprising:

extracting cell nucleus areas, cytoplasm areas and glandular cavity areas, respectively, based on luminance values of pixels of the digital color image;

measuring basic feature quantities representing features of shapes of the respective cell nucleus areas, cytoplasm areas and glandular cavity areas;

determining whether or not a particular kind of area that appears in a limited case according to the disease state of the tissue sample exists, for each of the cell nucleus areas, the cytoplasm areas and the glandular cavity areas based on the luminance values and the basic feature quantities;

measuring structure feature quantities representing the ways in which the cell nucleus areas are positioned, based on the basic feature quantities of the cell nucleus areas; and if the particular kind of area exists, extracting the particular kind of area and displaying it together with the structure feature quantities and the cell nucleus areas.

Furthermore, a storage medium storing a program according to the present invention, which is provided to achieve the above object, is a storage medium storing a program for causing a computer execute processing for a digital color image showing a stained tissue sample, the processing comprising:

extracting cell nucleus areas, cytoplasm areas and glandular cavity areas, respectively, based on luminance values of pixels of the digital color image;

measuring basic feature quantities representing features of shapes of the respective cell nucleus areas, cytoplasm areas and glandular cavity areas, which have been extracted;

determining whether or not a particular kind of area that appears in a limited case according to the disease state of the tissue sample exists, for each of the cell nucleus areas, the cytoplasm areas and the glandular cavity areas based on the luminance values and the basic feature quantities;

measuring structure feature quantities representing the ways in which the cell nucleus areas are positioned, based on the basic feature quantities of the cell nucleus areas; and if the particular kind of area exists, extracting the particular kind of area and displaying it together with the structure feature quantities and the cell nucleus areas.

According to the present invention, when a stained tissue sample has been input as a digital color image, whether or not a particular kind of area exists is determined and the structure feature quantities are displayed. Accordingly, a pathological expert can obtain many pieces of information useful for making a pathological diagnosis. As a result, enhanced pathological diagnosis support can be provided.

The above and other objects, features, and advantages of the present invention will become apparent from the following description with reference to the accompanying drawings which illustrate an example of the present invention.

BRIEF DESCRIPTION OF THE DRAWINGS

FIG. 6($b$) is a diagram illustrating an example of the shape of a gland with a single-layer of cell nuclei shown in a pathological image when a low power magnification of a tissue sample is made;

FIG. 6($c$) is a diagram illustrating an example of the shape of a gland with two layers of cell nuclei shown in a pathological image when a high power magnification of a tissue sample is made;

FIG. 6($d$) is a diagram illustrating an example of the shape of a gland with two layers of cell nuclei shown in a pathological image when a low power magnification of a tissue sample is made;

EXEMPLARY EMBODIMENT

Figure 1:
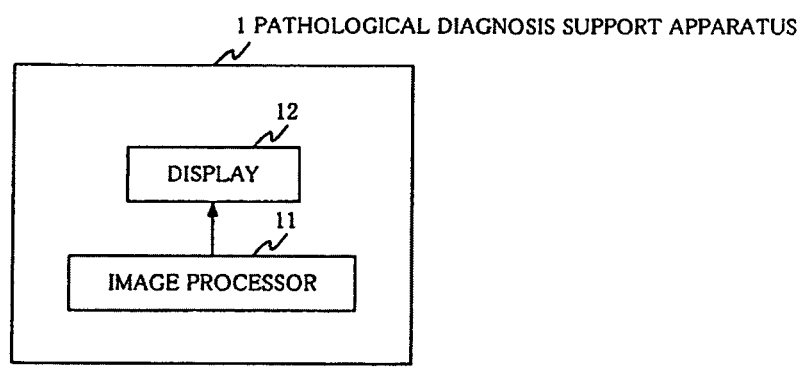
FIG. 1 is a block diagram illustrating a configuration of an exemplary embodiment of a pathological diagnosis support apparatus according to an exemplary embodiment.

FIG. 1 illustrates pathological diagnosis support apparatus 1 according to an exemplary embodiment, which includes image processor 11 and display 12.

First, the configuration of image processor 11 will be described.

Figure 2:
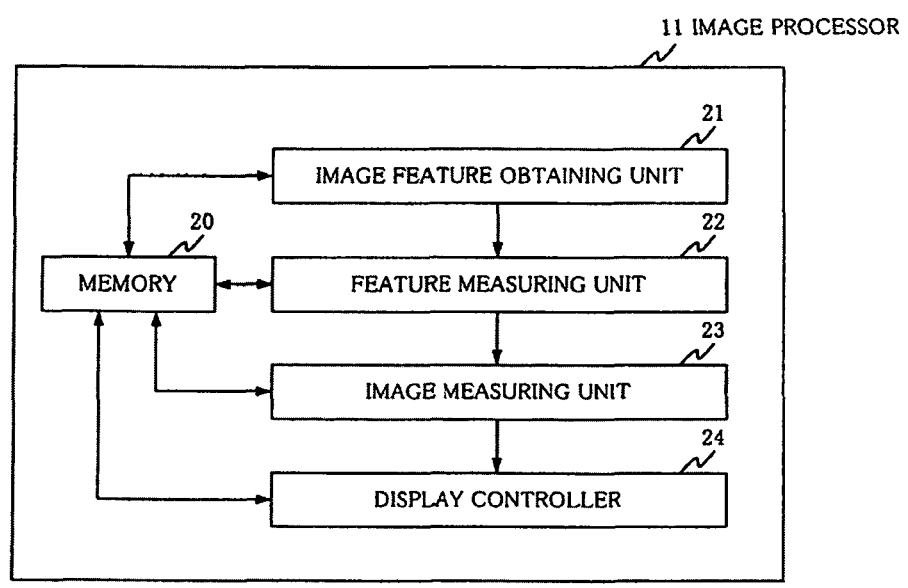
FIG. 2 is a block diagram illustrating a configuration of an image processor in a pathological diagnosis support apparatus according to an exemplary embodiment.

Image processor 11, as shown in FIG. 2, includes memory 20, image feature obtaining unit 21, feature measuring unit 22, image measuring unit 23 and display controller 24.

Memory 20 stores, e.g., pathological images input to pathological diagnosis support apparatus 1, and feature quantities measured by the components of image processor 11.

When a pathological image has been input, image feature obtaining unit 21 extracts basic feature areas, which form the basis of a tissue, such as cell nuclei, cytoplasms and glandular cavities, and particular kinds of areas which appear in limited cases according to the disease condition of the tissue sample, such as signet ring cells.

In the exemplary embodiment, a pathological image is a digital color image obtained by magnifying a gland tissue sample stained with H & E via a microscope and by taking an image thereof via a digital camera, and is supplied from an image input device and stored in memory 20. Since a pathological image is a digital color image, luminance values for red, green and blue are indicated for each pixel.

Feature measuring unit 22 measures basic feature quantities, which indicate the features of the shape of each basic feature area extracted by image feature obtaining unit 21, and includes the N/C ratio, area, circumferential length and degree of circularity, direction, etc.

Image measuring unit 23 measures structure feature quantities quantitatively indicating the features of the gland tissue structure using the results of measurement by feature measuring unit 22.

Display controller 24 makes display 12 display the basic feature areas and the particular kinds of areas extracted by image feature obtaining unit 21, the basic feature quantities measured by feature measuring unit 22, and the structure feature quantities measured by image measuring unit 23.

Next, display 12 will be described.

Display 12 is a monitor (display), and performs a display operation based on control by display controller 24.

Figure 3:
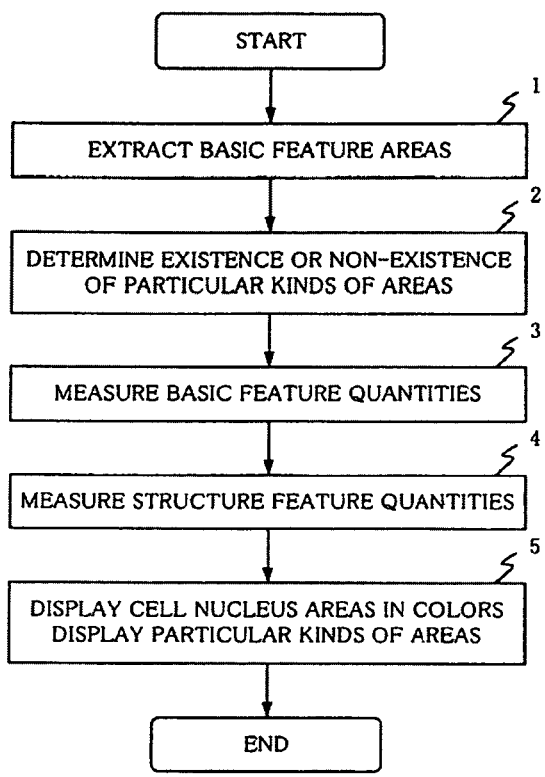
FIG. 3 is a flowchart illustrating an image processing operation performed by a pathological diagnosis support apparatus according to an exemplary embodiment.

Next, an image processing operation performed by the pathological diagnosis support apparatus according to the exemplary embodiment will be described with reference to FIG. 3.

Here, it is assumed that a pathological image is previously stored in memory 20.

First, image feature obtaining unit 21 extracts basic feature areas from the pathological image stored in memory 20 at step 1. More specifically, image feature obtaining unit 21 extracts cell nucleus areas, cytoplasm areas and glandular cavity areas, respectively, from the pathological image. Here, an operation for extracting cell nucleus areas, cytoplasm areas and glandular cavity areas, respectively, from the pathological image will be described in details.

In the exemplary embodiment, since the gland tissue sample is stained with H & E, cell nuclei are stained in blue, cytoplasms are stained in red, and glandular cavities are not stained. Consequently, in the pathological image, the cell nucleus areas have the characteristic of exhibiting a large luminance value for blue, the cytoplasm areas have the characteristic of exhibiting a large luminance value for red, and the glandular cavity areas have the characteristic of exhibiting a luminance value for the color of each area being indicated by a value related to white.

Therefore, using the aforementioned characteristics in the pathological image, image feature obtaining unit 21 identifies an area that includes a number of pixels with their luminance values for blue exceeding predetermined threshold value T1, the number of pixels exceeding a predetermined count, as a cell nucleus area. Also, image feature obtaining unit 21 identifies an area that includes a number of pixels with their luminance values for red exceeding predetermined threshold value T2, the number of pixels exceeding a predetermined count, as a cytoplasm area. Also, image feature obtaining unit 21 identifies an area that includes a number of pixels with luminance values representing white, the number of pixels exceeding a predetermined count, as a glandular cavity area. Consequently, cell nucleus areas, cytoplasm areas and glandular cavity areas are respectively extracted from the pathological image.

Upon extraction of the basic feature areas, image feature obtaining unit 21 subsequently determines whether or not particular kinds of areas exist at step 2. More specifically, image feature obtaining unit 21 determines whether or not the pathological image includes signet ring cell areas in which signet ring cells exist, mucus areas in which mucus exists, and foreign body areas showing calculi and/or crystalloids generated in the glandular cavities. Here, an operation of extracting signet ring cell areas, mucus areas and foreign body areas, respectively from the pathological image will be described in detail.

First, an operation of extracting a signet ring cell area will be described.

A signet ring cell is a cell often observed in a pathological image showing stomach cancer. Finding of a signet ring cell enables a pathological expert to immediately make the diagnosis of cancer, and accordingly, whether or not a signet ring cell exists is an important clue in pathological diagnosis.

Figure 4:
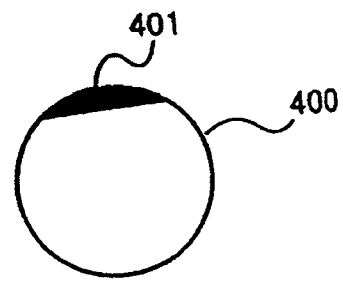
FIG. 4 is a diagram illustrating an example of a signet ring cell shown in a pathological image.

A signet ring cell, like signet ring cell 400 shown in FIG. 4, has the characteristic of having a shape close to a circle and including a crescentic cell nucleus along the edge of the circle. Also, a signet ring cell has the characteristic of including stained mucus inside.

Therefore, image feature obtaining unit 21, first, extracts stained regions that include a number of pixels with their luminance values for blue exceeding threshold value T1, the number of pixels exceeding a predetermined count, and also include a number of pixels with their luminance values for red exceeding threshold value T2, the number of pixels exceeding a predetermined count. Subsequently, image feature obtaining unit 21 calculates the degree of circularity of each of the extracted stained regions, using formula (2) below.

$$\text{Degree of circularity} = 4\pi * S/(L*L) \qquad (2)$$

In formula (2) above, S is the area of a stained region (number of pixels) and L is the circumferential length of the stained region (length of the contour of the stained region). The degree of circularity obtained according to formula (2) above indicates the degree of similarity to a circle, which is expressed in the form of a value in the range of 0 to 1, in which the shape of the stained region is more similar to a circle as the value is closer to 1.

Upon the calculation of the degree of circularity, image feature obtaining unit 21 selects stained regions whose calculated degrees of circularity exceed predetermined threshold value T3. Then, image-feature obtaining unit 21 determines whether or not each of the selected stained regions has its cell nucleus area positioned along the contour. If there is a stained region having its cell nucleus area along the contour, image feature obtaining unit 21 calculates a vector length, using formula (3) below.

$$\text{Vector length} = 1 - (\text{minor axis}/\text{major axis}) \quad (3)$$

Here, a vector length will be described with reference to FIG. 5.

Figure 5:
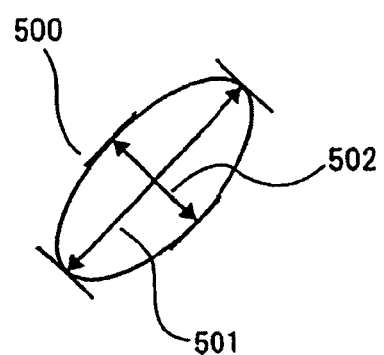
FIG. 5 is a diagram illustrating an example of the shape of a cell nucleus shown in a pathological image.

The major axis and minor axis included in formula (3) above correspond to major axis 501 and minor axis 502 of cell nucleus 500 shown in FIG. 5. A vector length is a value for characterizing a shape as a circle or an oval, as indicated in formula (3) above, and the shape is closer to an oval as the vector length is closer to 1, and the shape is closer to a circle as the vector length is closer to 0. Image feature obtaining unit 21 identifies a stained region that includes a cell nucleus area having a vector length exceeding predetermined threshold value T4 as a signet ring cell area. Consequently, signet ring cell areas are extracted from the pathological image.

Next, an operation for extracting a mucus area will be described.

Although finding mucus in a pathological image does not immediately lead to the diagnosis of cancer, it may be an effective factor for cancer diagnosis when it is combined with other clues.

Mucus is stained in a red color that is lighter than the red color used for cytoplasm, as a result of H & E staining. Accordingly, the mucus subjected to H & E staining has the characteristic of exhibiting a luminance value for red that is smaller than that of cytoplasm in the pathological image. Therefore, image feature obtaining unit 21 identifies an area, which includes a number of pixels falling within a predetermined range with the lower limit red luminance value being T5 and the upper limit being threshold value T2 mentioned above in the pathological image, the number of pixels exceeding a predetermined count, as a mucus area. Consequently, mucus areas are extracted from the pathological image.

Next, an operation for extracting a foreign body area will be described.

A calculus or crystalloid is indicated by a luminance value for a color other than white in a glandular cavity area in a pathological image, and has the characteristic of having a rectangular shape, which is uncommon in a normal biological tissue.

Therefore, first, image feature obtaining unit 21 extracts an area whose luminance value is related to a color other than white in a glandular cavity area. Subsequently, image feature obtaining unit 21 calculates the degree of circularity and the vector length of the extracted area, using formulae (2) and (3) above. Then, image feature obtaining unit 21 identifies the area as a foreign body area if the degree of circularity and vector length of the area are smaller than respective predetermined values. Consequently, foreign body areas are extracted from the pathological image.

Upon the extraction of the particular kinds of areas by image feature obtaining unit 21, feature measuring unit 22 measures the basic feature quantities at step 3 and stores them in memory 20. More specifically, feature measuring unit 22 calculates the N/C ratios, areas, circumferential lengths and circularity degrees of the basic feature areas, and also calculates the directional vectors of the cell nuclei.

A directional vector is a feature quantity representing the shape and direction of a cell nucleus with its gravity center used as the origin, and the feature quantity representing the shape is a vector length calculated using formula (3) above. Also, the feature quantity representing the direction is an angle value representing the direction of the major axis, and the angle value may be an angle within a range of from 0 to 180 degrees when the horizontal direction of the pathological image is 0 degrees.

A gland has a characteristic in which: when cells are normal or of a benign tumor, the cell nuclei included in the gland duct have an elongated shape; and when cells are cancer cells, the cell nuclei included in the gland duct have a round shape. Thus, calculation of directional vectors enables distinction between elongated cell nuclei and rounded cell nuclei, making it possible to determine whether or not the gland has a cancer. A gland duct is an aggregate of cell nuclei surrounding a glandular cavity, and forms a gland together with the glandular cavity.

The basic feature quantities calculated as a result of the operation at step 3 are related to the respective basic feature areas and stored in memory 20.

Upon the measurement of the basic feature quantities by feature measuring unit 22, image measuring unit 23 measures structure feature quantities at step 4. More specifically, image measuring unit 23 extracts a gland area, and measures the density of the gland area and the polarity of the cell nuclei, and determines whether or not there are two layers of cell nuclei.

First, an operation for extracting a gland area will be described.

A gland, as described above, is formed of a gland cavity and a gland duct. Since a glandular cavity normally includes no cell tissues, it is possible to extract a gland area based on a glandular cavity area. However, a glandular cavity may be stained in a light color as a result of H & E staining, or may also be contaminated by foreign bodies such as stained mucus, calculi and/or crystalloids. Accordingly, a gland area may be missed if extraction is performed simply based on a glandular cavity area.

Therefore, using the fact that a gland duct is shown as the edge (contour) of a gland area in a pathological image, image measuring unit 23 calculates the difference in luminance value between adjacent pixels in the pathological image, and identifies an area surrounded by pixels with the calculated differences exceeding a predetermined value as a gland area. Consequently, gland areas can be reliably extracted.

Upon the extraction of the gland areas, image measuring unit 23 measures the gland density representing the number of gland areas in the entire pathological image or a region with a predetermined area in the pathological image and stores it in memory 20. In a pathological image, a region with a high gland density indicates high density of gland ducts. In other words, it indicates occurrence of abnormal cell growth.

Upon the measurement of the gland density, image measuring unit 23 determines whether or not there are two layers of cell nuclei included in a gland duct in each gland area. The determination result serves as information necessary for making a diagnosis of breast cancer or prostate cancer. When it has been determined that there are two layers of cell nuclei, the gland will be determined to be normal or have a benign tumor.

When the tissue sample is magnified with a low power, it can be seen with reference to FIG. 6(*b*) and FIG. 6(*d*) that gland duct 602 and gland duct 601 are different in thickness. Therefore, image measuring unit 23 measures the gland duct thickness of each of the identified gland areas. Then, image measuring unit 23 determines that there are two layers, for a gland duct whose measured thickness exceeds predetermined threshold value T6, and determines that there are not two layers, for a gland duct whose measured thickness is smaller than threshold value T6, and relates the determination results to the respective gland areas and stores them in memory 20.

Figure 6A:
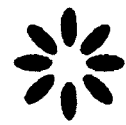
FIG. 6($a$) is a diagram illustrating an example of the shape of a gland with a single-layer of cell nuclei shown in a pathological image when a high power magnification of a tissue sample is made.
Figure 6B:
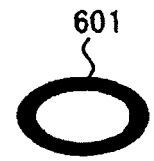
Figure 6C:
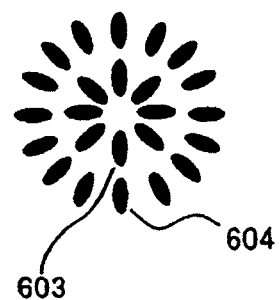
Figure 6D:
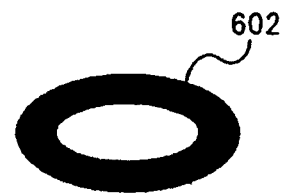

When the tissue sample is magnified at high power, it can be seen with reference to FIGS. 6(a) and 6(c) that there are two cell nuclei in the same direction within a predetermined distance, like cell nucleus 604 and cell nucleus 603, when a gland has two layers of cell nuclei.

Accordingly, image measuring unit 23 reads the directions of the directional vectors related to the respective cell nuclei for each gland area, and determines whether or not there are cell nuclei in such a positional relationship cell as that for nuclei 603 and 604. Then, image measuring unit 23 determines that there are two layers, for a gland area having two cell nuclei in the same direction within a predetermined distance, and determines that there are not two layers, for a gland area having no cell nuclei in the same direction within a predetermined distance, and relates the determination results to the respective gland areas and stores them in memory 20.

Upon determination about existence or non-existence of two layers, image measuring unit 23 measures the polarity of cell nuclei. A polarity of cell nuclei is a feature quantity representing variations in the area and/or shape of cell nuclei from the inner side to the outer side of a tissue. While in a normal or benign tissue, variations in directions and/or sizes of cell nuclei are kept in a fixed direction, in a cancerous tissue, the variations cannot be kept in a fixed direction and are disordered.

Therefore, image measuring unit 23 measures a variation value (value representing variation) for the areas of the cell nucleus areas measured by feature measuring unit 22, for the entire pathological image or a predetermined region thereof, and a variation value for the angle values represented by the directional vectors, for the entire pathological image or a predetermined area thereof, respectively. Then, the calculated variation values are stored in memory 20 as the polarity of the cell nuclei.

Upon the measurement of the polarity of the cell nuclei by image measuring unit 23, display controller 24 makes display 12 show the cell nucleus areas in colors set in advance in relation to the angle values and vector lengths represented by directional vectors, and also makes display 12 show the particular kinds of areas extracted as a result of the operation at step 3, at step 5. Here, display of colors of the cell nucleus areas will be described.

Figure 7:
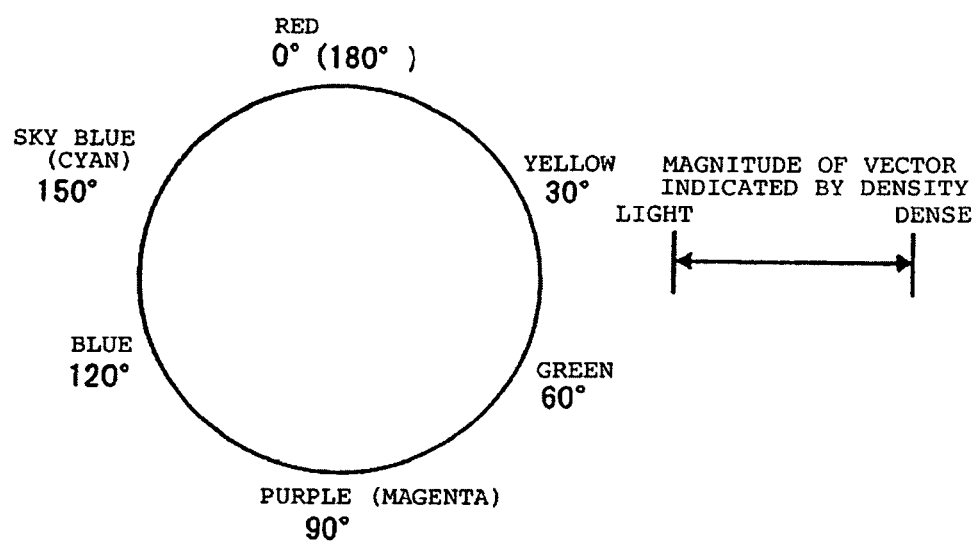
FIG. 7 is a diagram illustrating correspondence between a directional vector and colors.

In the exemplary embodiment, as shown in FIG. 7, colors shown on display 12 are set in relation to angle values represented by directional vectors. For example, a cell nucleus area with a directional vector angle value of 30° is displayed in yellow. Also, a luminance value is set according to a vector length, and in the exemplary embodiment, the settings are made so that the luminance value becomes larger as the vector length becomes larger.

As a result of display 12 showing cell nucleus areas in colors as described above, it is possible to display the state of variations in shape and directions of cell nuclei, that is, the features of the tissue sample structure, in a manner in which such variations and features can be easily recognized visually.

Figure 8:
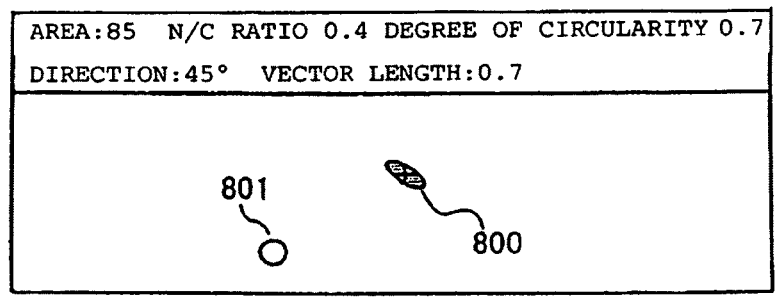
FIG. 8 is a diagram illustrating an example of a displayed image provided by a pathological diagnosis support apparatus according to an exemplary embodiment.

In the operation at step 5, not only the cell nuclei are displayed in colors, but also, for example, the basic feature quantities of a cell nucleus selected by a pathological expert may be displayed as in the displayed image shown in FIG. 8. In this case, pathological diagnosis support apparatus 1 is provided with an operation device, such as a mouse, for example, and the pathological expert selects a cell nucleus via the operation device.

Display of the basic feature quantities of a cell nucleus as described above enables display of increased pieces of useful information related to a pathological diagnosis, and accordingly, further enhanced pathological diagnosis support can be provided. FIG. 8 shows the shape and basic feature quantities of cell nucleus 800, which has been selected by a pathological expert, together with signet ring cell 801, which is a particular kind of area.

In the exemplary embodiment, when a pathological image is input as a digital color image, a determination is made whether or not it includes particular kinds of areas and the structure feature quantities are displayed. Thus, a pathological expert can obtain useful information for making a pathological diagnosis. Consequently, enhanced pathological diagnosis support can be provided.

The present invention may be carried out by storing a program, that causes a computer to execute the above-described image processing method, in a storage medium, and reading and executing the program by means of the computer.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A pathological diagnosis support apparatus to which a digital color image showing a stained tissue sample is input, the apparatus comprising:

a display that performs a display operation; and an image processor that when the digital color image is input, extracts cell nucleus areas, cytoplasm areas and glandular cavity areas, respectively, based on luminance values of pixels of the digital color image, measures basic feature quantities representing features of shapes of the respective cell nucleus areas, cytoplasm areas and glandular cavity areas, which have been extracted, determines whether or not a particular kind of area that appears in a limited case according to the disease state of the tissue sample exists, for each of the cell nucleus areas, the cytoplasm areas and the glandular cavity areas based on the luminance values and the basic feature quantities, and measures structure feature quantities representing the ways in which the cell nucleus areas are positioned, based on the basic feature quantities of the cell nucleus areas, and if the particular kind of area exists, extracts the particular kind of area and makes the display show it together with the structure feature quantities and the cell nucleus areas, wherein the image processor includes:

a memory that stores the digital color image, the basic feature quantities, and the structure feature quantities;

a feature measuring unit that measures for each of the cell nucleus areas a vector length, which is a value for characterizing each of the cell nucleus areas as having a round shape or an oval shape, an angle value representing a direction of a major axis of each of the cell nucleus areas in relation to an angle, and alignment, of cell nuclei, including thickness of in gland ducts, as the basic feature quantities; and a display controller that makes the display show the cell nucleus areas in colors predetermined in relation to the vector lengths and the angle values, wherein cancer cells are identified based upon a manner in which nuclei of the cancer cells are positioned, polarities of the nuclei corresponding to the manner, by measuring the polarities, the polarities representing variations in area and/or shape of the nuclei from tissue inner sides to tissue outer sides, wherein the cancer cells are detected as cancerous due to the polarities not being in a fixed direction and being disordered, and wherein other cells are not detected as cancerous where polarities of nuclei of the other cells are in the fixed direction and are ordered.

2. A method for supporting a pathological diagnosis using a digital color image showing a stained tissue sample, the method comprising:

extracting cell nucleus areas, cytoplasm areas and glandular cavity areas, respectively, based on luminance values of pixels of the digital color image;

measuring basic feature quantities representing features of shapes of the respective cell nucleus areas, cytoplasm areas and glandular cavity areas;

determining whether or not a particular kind of area that appears in a limited case according to the disease state of the tissue sample exists, for each of the cell nucleus areas, the cytoplasm areas and the glandular cavity areas based on the luminance values and the basic feature quantities;

measuring structure feature quantities representing ways in which the cell nucleus areas are positioned, based on the basic feature quantities of the cell nucleus areas;

if the particular kind of area exists, extracting the particular kind of area and displaying it together with the structure feature quantities and the cell nucleus areas;

measuring for each of the cell nucleus areas a vector length, which is a value for characterizing each of the cell nucleus areas as having a round shape or an oval shape, an angle value representing a direction of a major axis of each of the cell nucleus areas in relation to an angle, and alignment, of cell nuclei, including thickness of in gland ducts, as the basic feature quantities; and displaying the cell nucleus areas in colors predetermined in relation to the vector lengths and the angle values, wherein cancer cells are identified based upon a manner in which nuclei of the cancer cells are positioned, polarities of the nuclei corresponding to the manner, by measuring the polarities, the polarities representing variations in area and/or shape of the nuclei from tissue inner sides to tissue outer sides, wherein the cancer cells are detected as cancerous due to the polarities not being in a fixed direction and being disordered, and wherein other cells are not detected as cancerous where polarities of nuclei of the other cells are in the fixed direction and are ordered.

3. A non-transitory computer readable medium storing a program for causing a computer to execute processing for a digital color image showing a stained tissue sample, the processing comprising:

extracting cell nucleus areas, cytoplasm areas and glandular cavity areas, respectively, based on luminance values of pixels of the digital color image;

measuring basic feature quantities representing features of shapes of the respective cell nucleus areas, cytoplasm areas and glandular cavity areas, which have been extracted;

determining whether or not a particular kind of area that appears in a limited number of cases according to the disease state of the tissue sample exists, for each of the cell nucleus areas, the cytoplasm areas and the glandular cavity areas based on the luminance values and the basic feature quantities;

measuring structure feature quantities representing ways in which the cell nucleus areas are positioned, based on the basic feature quantities of the cell nucleus areas;

if the particular kind of area exists, extracting the particular kind of area and displaying it together with the structure feature quantities and the cell nucleus areas;

measuring for each of the cell nucleus areas a vector length, which is a value for characterizing each of the cell nucleus areas as having a round shape or an oval shape, an angle value representing a direction of a major axis of each of the cell nucleus areas in relation to an angle, and alignment, of cell nuclei, including thickness of in gland ducts, as the basic feature quantities; and displaying the cell nucleus areas in colors predetermined in relation to the vector lengths and the angle values, wherein cancer cells are identified based upon a manner in which nuclei of the cancer cells are positioned, polarities of the nuclei corresponding to the manner, by measuring the polarities, the polarities representing variations in area and/or shape of the nuclei from tissue inner sides to tissue outer sides, wherein the cancer cells are detected as cancerous due to the polarities not being in a fixed direction and being disordered, and wherein other cells are not detected as cancerous where polarities of nuclei of the other cells are in the fixed direction and are ordered.

\* \* \* \* \*